March 11, 1958  G. E. ALGATT ET AL  2,825,974
GAGING DEVICE FOR APERTURED PARTS
Filed Sept. 2, 1954  2 Sheets-Sheet 1
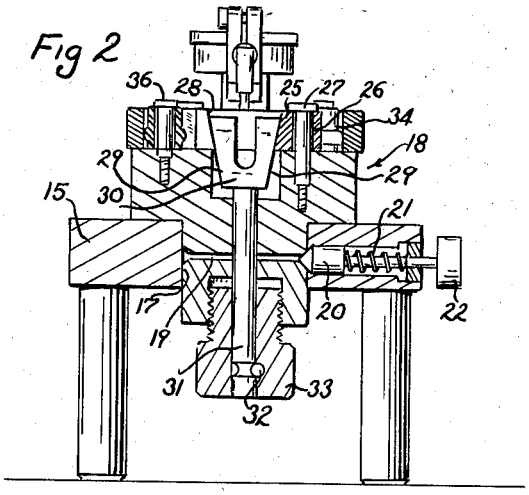
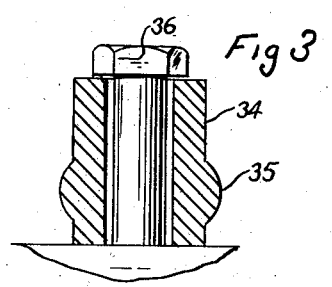
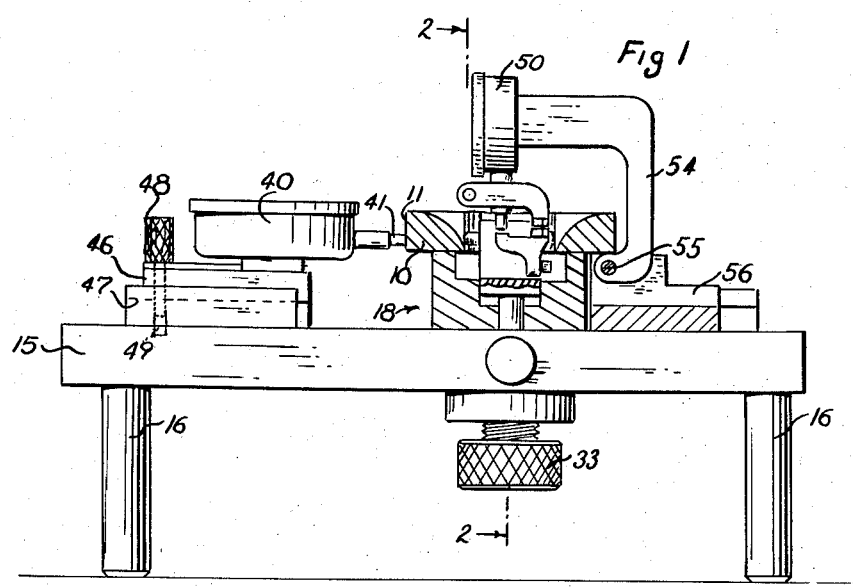
INVENTORS
G. E. ALGATT
C. L. BEISINGER
BY
ATTORNEY

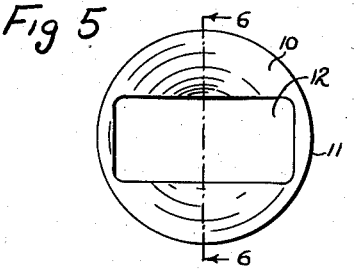
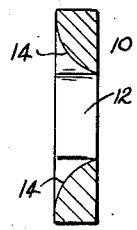
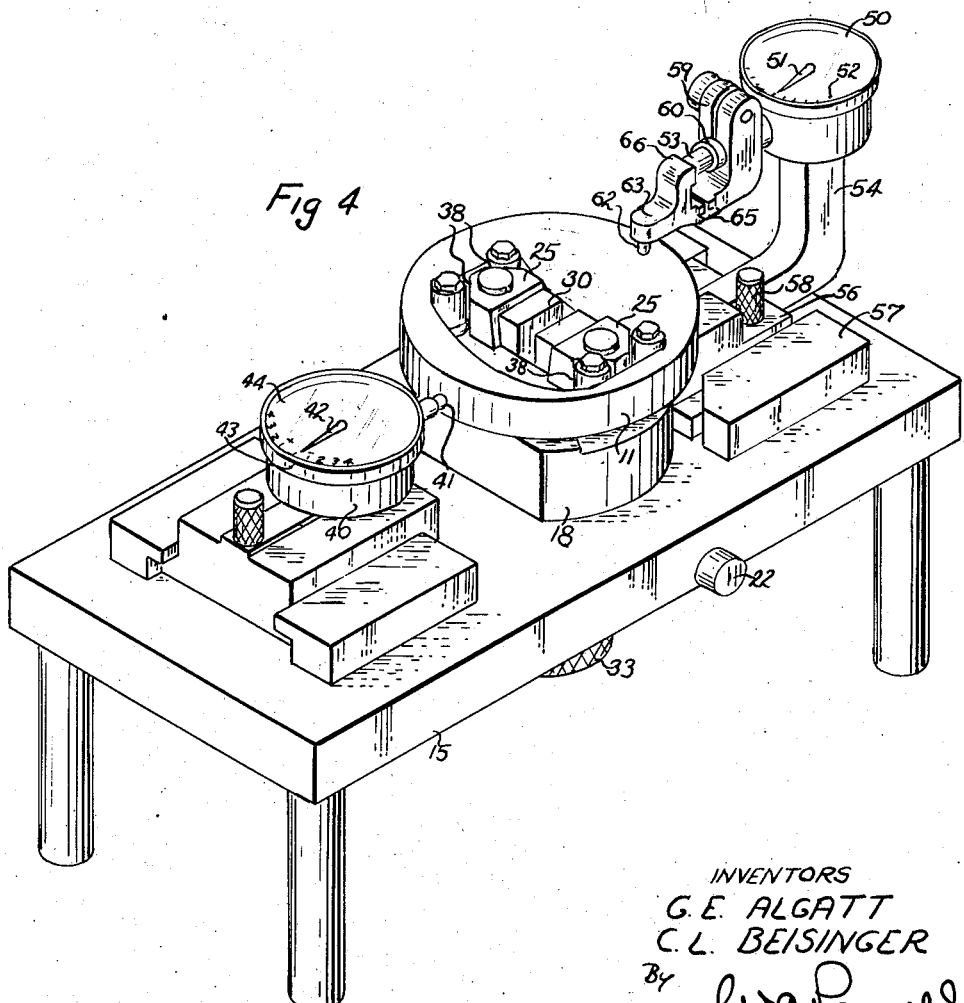

United States Patent Office 2,825,974
Patented Mar. 11, 1958

2,825,974

GAGING DEVICE FOR APERTURED PARTS

George E. Algatt and Clarence L. Beisinger, Allentown, Pa., assignors to Western Electric Company, Incorporated, New York, N. Y., a corporation of New York Application September 2, 1954, Serial No. 453,723

2 Claims. (Cl. 33—174)

This invention relates to apparatus for gaging apertured articles particularly apparatus for gaging the relative positions of surfaces of an article with respect to apertures therein.

In the manufacture of certain apertured articles, it is sometimes important to have the aperture very accurately located with respect to some reference surface and to provide the walls of the aperture with accurately curved contours. In one case, for example, a thick disc-like member has an outer peripheral reference surface and a flared rectangular aperture which must be accurately centered with respect to the reference surface.

The object of the present invention is an apparatus adapted to quickly and efficiently locate apertured articles successively through direct association with the apertures and to gage the contours of the apertures and their relationship to given surfaces of the articles.

With this and other objects in view, the invention comprises an apparatus adapted to centralize apertures of successive articles relative to gaging units respectively adapted to gage surfaces of the successive articles relative to the apertures therein.

More specifically, a holder mounted for movement about an axis has holding means for the successive articles partially receivable in the substantially rectangular apertures to position the centerlines of the apertures coincident with an axis of the holder. A gaging unit is movable into gaging position with respect to a peripheral surface of the article to determine whether or not spaced portions of this surface are within predetermined limits of a known distance with respect to the aperture of the article. Another gaging unit slidable on its support into gaging position may be rocked about a pivot to gage the arcuate contour of spaced surfaces of the aperture.

Other objects and advantages will be apparent from the following detailed description when considered in conjunction with the accompanying drawings, wherein:

Fig. 1 is a side elevational view of the apparatus shown engaging an article (portions of the apparatus and the article being shown in section);

Fig. 2 is a vertical, sectional view taken substantially along the line 2—2 of Fig. 1;

Fig. 3 is an enlarged fragmentary sectional view of one of the rollers of the article holder;

Fig. 4 is an isometric view of the apparatus shown with one of the gaging units in gaging position;

Fig. 5 is a top plan view of one of the articles to be gaged, and

Fig. 6 is a sectional view taken along the line 6—6 of Fig. 5.

Referring now to the drawings, attention is directed first to the article 10 to be gaged. The article is circular having a peripheral surface 11 and provided with an aperture 12 which is substantially rectangular in general contour. The opposing surfaces 14 of the longer sides of the aperture are to be of certain contours having radii of predetermined dimensions.

The apparatus for gaging successive articles of the type shown in Figs. 5 and 6 includes a table 15 supported by legs 16 and apertured at 17 (Fig. 2), to receive a holder indicated generally at 18. The holder 18 has an aperture 19 with outwardly flared ends as shown in Fig. 2 to receive a spring pressed plunger 20 normally urged by its spring 21 to enter either end of the aperture 19 to lock the holder 18 in either one of two positions. A handle 22 of the plunger 20 permits normal release of the plunger for movement of the holder 18 from one gaging position to another determined by the ends of the aperture 19.

The upper surface of the holder 18 supports slides 25 with elongate apertures 26 therein to receive headed pins 27 threadedly mounted in the holder 18. The pins 27 hold the slides 25 against displacement but permit movement of the slides toward and away from each other to respectively receive the articles and to secure them in position. The inner surfaces 28 of the slides 25 are tapered to cooperate with the tapered opposing surfaces 29 of a cam 30. The cam 30 is mounted on a rod 31 connected at 32 to a knurled nut 33 threadedly mounted in the lower end of the member 18 whereby the cam may be moved up or down to free the slides 25 to move toward each other or to force them away from each other. Sleeves 34 having annular or ball-like enlarged portions 35 are supported by the upper surface of the holder 18 and free to move limited distances relative to their retaining means in the form of headed pins 36 threadedly mounted in the holder 18. Tapered outer surfaces 38 of the slides 25 when moved outwardly by the cam 30 will move the sleeves 34 into their respective curved corners of the aperture 12 to locate the centerline of the aperture of each article coincident with the axis of the holder 18.

A gaging unit 40 having a plunger 41 to engage the surface 11 of the article 10 has a pointer 42 under the control of the plunger 41 and normally biased beyond a point 43 on its dial 44. The unit 40 is supported on a slide 46 (Fig. 1) positioned between guides 47 mounted on the table 15 and provided with a locking pin 48 receivable in an aperture 49 to locate the unit in its gaging position relative to the holder 18.

A gaging unit 50 having a pointer 51 movable relative to a dial 52 actuable through a plunger 53 is supported by an arm 54 pivoted at 55 on a slide 56. The slide 56 is positioned between guides 57 and is provided with a pin 58 similar in structure and purpose to the pin 48 and receivable in an aperture (not shown) in the table 15 to lock the slide 56 and its unit 50 in gaging position. A bracket 59 is mounted on a sleeve 60 of the unit 50 through which the plunger 53 extends. A gaging pin 62 supported by a lever type arm 63 is connected for accurate pivotal movement to the bracket 59 through the aid of a resilient metal member 65 so that the upper portion 66 may register with the plunger 53 of the gage unit and transfer any motion imparted to the pin 62 to the plunger.

Considering now the operation of the apparatus, let it be assumed that the apparatus is in its open position to receive the next article to be gaged. The open position finds the gaging units 40 and 50 moved away from the holder 18 and the threaded element or nut 33 loosened to allow the cam 30 to move upwardly to free the slides 25 for movement inwardly toward each other. While in this position, the next article to be gaged may be placed upon the upper surface of the holder 18 so that the aperture 12 will receive the sleeves 34. First the operator will rotate the threaded element 33 to actuate the clamping means including the cam 30 and the slides 25 and their sleeves 34. The cam 30 moves the slides 25 outwardly away from each other and the tapered surfaces 38 move the sleeves with their ball like contours 35 into their respective corners of the aperture 12 thereby positioning the centerline of the aperture coincident with the axis of the holder 18. Therefore, by accurately locating the apertures of each article so that its centerline will be at a known position and that position is coincident with the axis of the holder, any variations in the peripheral surfaces 11 and the arcuate contours of the apertures may be determined by the gaging units 40 and 50. When the article is secured in place, the unit 40 may be moved into gaging position determined by the aperture 49 for the pin 48. In a similar manner, the unit 50 may be moved into its gaging position determined by the aperture (not shown) for the pin 58. The gaging unit 40 by its plunger 41 engaging the peripheral surface 11 will indicate a plus or minus measurement if the pointer is located out of registration with the preferred or perfect marking 43. While in the present position determined by the spring pressed plunger 22, the gaging unit 50 may be swung about its pivot 55 to cause the projection 62 to ride on the adjacent arcuate surface 14 of the article and through its direct association with the plunger 53 of the gaging unit 50, any variation from a predetermined standard will register by movement of the pointer 51 relative to the dial 52. When this surface of the article has been gaged, the unit 50 may be swung into the position shown in Fig. 4 and the holder 18 may be released to rotate 180° where the plunger will enter the opposite end of the aperture 19 (Fig. 2). If desired, the gaging unit 40 may be observed to determine variations in the peripheral surface 11, throughout its contour or at diametrically opposite positions, relative to the centerline of the aperture 19. After rotation of the holder 18 one-half turn, the unit 50 may be moved again about its pivot 55 to gage the adjacent arcuate surface 14 of the aperture 12. When the gaging operations have been completed, the units 40 and 50 may be returned to their normal or open positions and the element 33 may be loosened to free the gaged article so that the holder 18 may receive the next article to be gaged. Through these gaging operations, it will be observed that the location of the successive articles center about the apertures thereof and particularly about the axis of the holder for the articles. Furthermore, the gaging units although movable away from the article holder are movable into known gaging positions with respect to the axis of the holder which in all instances becomes the centerline of the aperture of each article to make it possible to gage not only the surfaces of the aperture but a given surface of each article to determine their accuracies with respect to the aperture and the centerline thereof.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for gaging outwardly curved arcuate portions of a surface of an aperture of an article relative to a predetermined standard arc about a known centerline, the apparatus comprising a table positioned adjacent the known centerline, a holder to support the article mounted for rotary movement on the table to singly position the arcuate portions of the surface of the article in a gaging position relative to the known centerline, clamping elements mounted for sliding movement on the holder toward each other to be received in the aperture of the article, a cam interposed between the clamping elements, means supported by the holder to move the cam relative thereto to move the elements outwardly to engage firmly spaced portions of the surface of the aperture other than the portions to be gaged and locate the article on the holder relative to the known centerline, a gage supported by the table adjacent the holder for arcuate movement about an axis coincident with the known centerline and having an actuable plunger to move a pointer of the gage relative to a predetermined indication on a dial of the gage, and an actuator supported by the gage for movement therewith and relative thereto and having spaced arms, one to enter the aperture and ride on an arcuate portion of the surface disposed in the gaging position and the other positioned to engage and actuate the plunger to actuate the pointer of the gage to indicate, by the position of the pointer relative to the predetermined indication, any variation in the contour of the arcuate portion of the surface of the aperture from the predetermined standard arc.

2. An apparatus for gaging outwardly curved arcuate portions of a surface of an aperture of an article relative to a predetermined standard arc about a known centerline, the apparatus comprising a table positioned adjacent the known centerline, a holder to support the article mounted for rotary movement on the table to singly position the arcuate portions of the surface of the article in a gaging position relative to the known centerline, clamping elements mounted for sliding movement on the holder toward each other to be received in the aperture of the article, a cam interposed between the clamping elements, means supported by the holder to move the cam relative thereto to move the elements outwardly to engage firmly spaced portions of the surface of the aperture other than the portions to be gaged and locate the article on the holder relative to the known centerline, a gage supported by the table adjacent the holder for arcuate movement about an axis coincident with the known centerline and having an actuable plunger to move a pointer of the gage relative to a predetermined indication on a dial of the gage, an actuator supported by the gage for movement therewith and relative thereto and having spaced arms, one to enter the aperture and ride on an arcuate portion of the surface disposed in the gaging position and the other positioned to engage and actuate the plunger to actuate the pointer of the gage to indicate, by the position of the pointer relative to the predetermined indication, any variation in the contour of the arcuate portion of the surface of the aperture from the predetermined standard arc, a second gage unit with a plunger actuable to move a pointer relative to a dial, a slide supported by the table for guided movement in a given path and having the second gage mounted thereon, and means to lock the slide in a given position whereby the second gage actuated by its plunger engaging the periphery of the article on the holder will indicate the position of the periphery of the article relative to the arcuate portion of the surface of the aperture being gaged.

References Cited in the file of this patent

UNITED STATES PATENTS

| 1,361,848 | Green | Dec. 14, 1920 |
| 1,431,614 | Wittner | Oct. 10, 1922 |
| 1,488,564 | Steinle | Apr. 1, 1924 |
| 2,331,987 | Leatherman | Oct. 19, 1943 |
| 2,371,451 | Larson | Mar. 13, 1945 |
| 2,407,490 | Gregg | Sept. 10, 1946 |
| 2,408,689 | Seme | Oct. 1, 1946 |
| 2,425,381 | Lovick | Aug. 12, 1947 |
| 2,443,895 | Day | June 22, 1948 |
| 2,580,949 | Parker | Jan. 1, 1952 |
| 2,601,447 | Neff | June 24, 1952 |
| 2,636,379 | Van Dorn | Apr. 28, 1953 |
| 2,712,181 | Mahlmeister | July 5, 1955 |

OTHER REFERENCES

Machinery, page 794, June 1, 1925.
American Machinist, page 130, Feb. 14, 1946.